MECHANICAL RESONATOR FOR NORMAL FREQUENCY OSCILLATORS IN TIMEKEEPERS

Filed May 16, 1966

INVENTOR

Heinz WALDBURGER

By Wenderoth, Lind and Ponack
attorneys 3,412,549

MECHANICAL RESONATOR FOR NORMAL FREQUENCY OSCILLATORS IN TIMEKEEPERS

Heinz Waldburger, Neuchatel, Switzerland, assignor to Centre Electronique Horloger S.A., Neuchatel, Switzerland Filed May 16, 1966, Ser. No. 550,424
Claims priority, application Switzerland, May 26, 1965, 7,351/65
11 Claims. (Cl. 58—23)

ABSTRACT OF THE DISCLOSURE

A mechanical resonator for normal frequency oscillators in timekeepers having fixed mounting means. Two resilient vibrators are provided and each of the vibrators forms one half of the resonator having the general shape of a capital theta arranged symmetrically in relation to the center of gravity of the resonator. A mass is located in the middle of each resonator so that a first axis of symmetry runs midway between and parallel to the transverse branches of the theta form and a second axis of symmetry, perpendicular to the first, runs through the middle of the two masses, the axes of symmetry intersecting in the center of gravity of the resonator. Coupling means couple the two vibrators together with resilient bearings connecting the coupling means resiliently with the mounting means whereby the bearing reactions excepting those of a higher order resulting from unavoidable imperfections will disappear and eliminate the influence of a gravitational field on the frequency of the resonator.

Figures 1, 2, 3, 4, 5, 6:
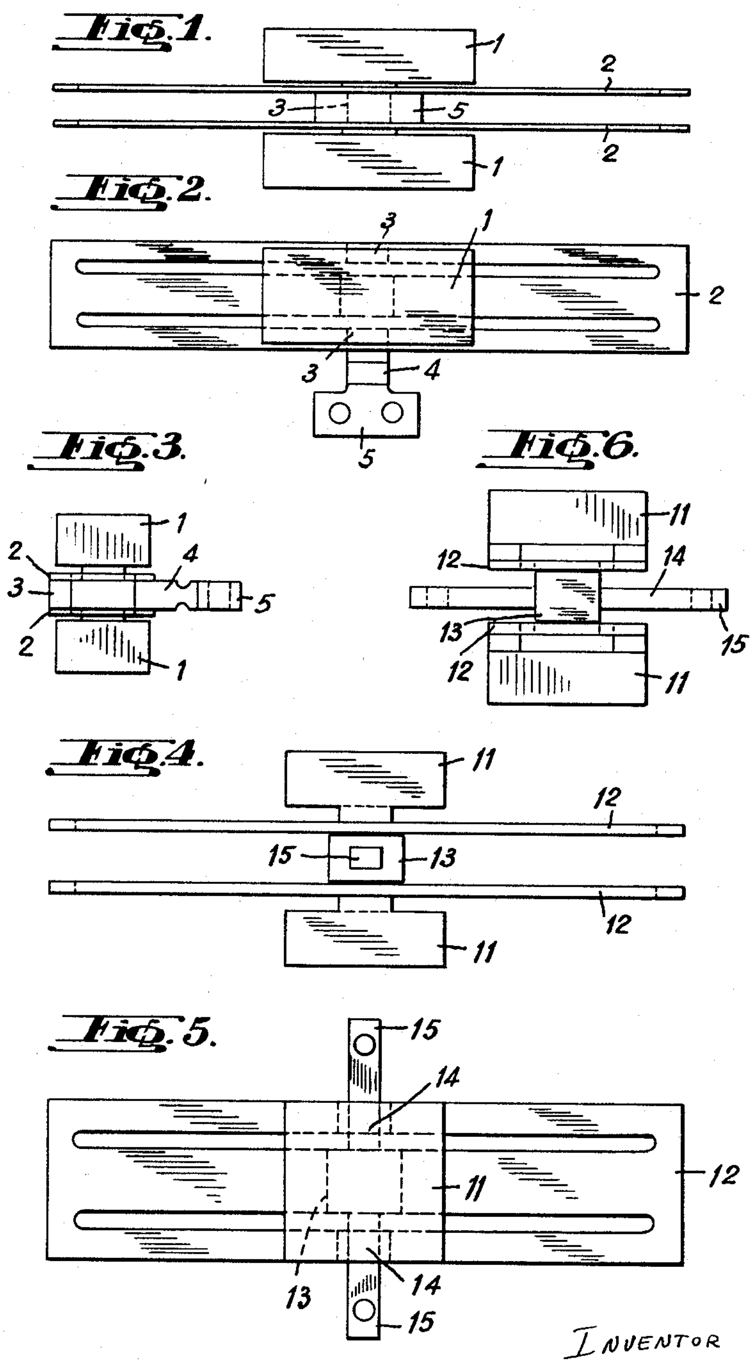

The use of a mechanical resonator for normal frequency oscillators in simple timekeepers depends on four important properties: (1) low frequency, (2) small position error, (3) high isochronism and (4) high quality factor.

In the use of the best known resonator, the tuning fork, a position error occurs, which for low frequencies below ca. 1 kHz. is considerably larger than the remaining errors. Consequently, various resonators have been developed, in the case of which, owing to the shape given them, no position error occurs at all. In the case of the family of resonators consisting of two masses and two springs there exist the following possibilities for the elimination of the position error:

(1) The symmetry of the resonator has the effect that the resonant motion of the masses lies on a common straight line. Owing to this the influence of an eventual gravitational field is entirely eliminated.

(2) Mutual compensation of the position influences. This must be taken as meaning that the one half of the resonator is accelerated by an amount which is the same as the amount by which the other half is decelerated.

The mechanical resonator for normal frequency oscillators in timekeepers according to the invention makes use of the first of these possibilities. It is characterized by two resilient vibrators each forming one half of the resonator and which are in the general shape of a capital theta and are arranged symmterically in relation to the centre of gravity of the resontaor and each carrying a mass in its middle, in such a manner that a first axis of symmetry runs midway between and parallel to the transverse branches of the theta and that a second axis of symmetry, perpendicular to the first, runs through the middle of each mass, the axes of symmetry intersecting in the centre of gravity of the resonator, and characterized in addition by coupling means which couple the two vibrators one to the other, as well as by resilient bearings which connect the coupling means resiliently with the mounting means of the resonator which are immovable in space, in order to cause the bearing reactions excepting those of a higher order resulting from unavoidable imperfections, to disappear and thus to eliminate the influence of a gravitational field on the frequency of the resonator.

The resonator according to the invention is remarkable for the absence of position errors, bearing reactions and anisochronism even in the case of low frequencies. The two theta-shaped vibrators are appropriately formed by two identical springs each slit open in two places. These two springs are preferably held together in the middle of the two outer parts or in the middle of the central transversal branch of the theta by means of coupling members. The two masses mounted in the middle of the transversal branch respectively in the middle of the two outer spring parts effect a resonant motion in opposite directions. The two coupling members are resiliently connected to the securing points. The result of this is that the vibration having the same direction is effected at a lower frequency so that the unavoidable constructive and material differences in the two halves of the resonator are mutually compensated.

The two said axes of symmetry are to be considered in the dynamic sense. If the resonator is geometrically symmetrical with respect to these two axes it is of course also dynamically symmetrical, however a geometrical symmetry need not necessarily be materialized. For instance it may be constructively desirable in a clockwork to design the springs serving as vibrators and/or the masses so that they are not symmetrical. In this case care must be taken that the dynamical symmetry of the resonator is preserved.

Two embodiments of the invention will be described by way of examples with reference to the accompanying drawings.

FIGURES 1 to 3 respectively show a lateral view, a view from above and an end view of a first embodiment.

FIGURES 4 to 6 respectively show a lateral view, a view from above and an end view of a second embodiment.

In the embodiment illustrated in the FIGURES 1 to 3 two identical masses 1 are mounted in the middle of identical springs 2. The design of the general shape of the springs, which form vibrators in the shape of a capital theta, as well as their section are subect to no particular conditions apart from the fact that the dynamical symmetry must be preserved and that the local stresses in the material must remain within acceptable limits. The design of the general shape of the masses 1 is also only subject to the condition of dynamic symmetry.

The springs 2 are connected together by coupling members 3, which during the resonant operation are principally subjected to traction and compression forces. The coupling members 3 are connected to the securing point 5 by means of the resilient bearing member 4. The former remains exactly stationary in space.

The second embodiment illustrated in the FIGURES 4 to 6 differs from the preceding embodiment in that the two masses 11 are each mounted on the two outer parts of the springs 12 serving as theta-shaped vibrators and in that the two springs 12 are coupled together in the middle of the transversal branch by means of a coupling member 13. The resilient bearings 14 effect the connexions with the securing points 15, which remain exactly stationary in space.

In the illustrated embodiments the springs which serve as vibrators have the general shape of an elongated rectangle, which forms a theta drawn out sideways. These springs could however have any other desired theta shape, subject to the sole condition that the dynamic symmetry must be preserved, i.e. that the design of the springs and of the masses also must be such that there always results a resonant motion in opposition on a common straight line, in order that the reactions on the securing point may disappear. The dynamic symmetry may also be taken to mean that the two halves of the resonator each have the same frequency, but not necessarily the same stiffnesses and masses and in addition must of course vibrate on a common straight line; the centre of gravity of the whole resonator remains in fact exactly stationary at all times. Finally it is also possible, whilst preserving the obligatory dynamic symmetry, to vary the section of the springs as desired, in particular in such a manner that the stresses in the material remain small in the region of the coupling member as well as at both ends of the springs.

In particular it is possible, by appropriately designing the two slits and the outer shape of the springs, to obtain, even in the case of material of constant thickness, favourable conditions for the stresses in the material or for the construction of the timekeeper.

The masses may also be given any desired shape. The condition here also is that the dynamic symmetry must be preserved.

The resilient connexion of the coupling members with the securing points is subject to the usual conditions, i.e. it must insulate the securing points resiliently from the unavoidable inequalities in the two halves of the resonator.

In principle it is possible to divide the resonator in the middle of each of the two masses. This gives rise to a resonator having four mass points of considerably lower frequency.

The two slits determine the stiffnesses of the inner and of the two outer parts. They can be made so that the stiffness of the inner part is the same as that of the outer parts or so that these become substantially different. Thus the two masses may for instance be identical and the two vibrators have the same stiffness, or the two masses may be different the two vibrators having correspondingly different stiffnesses, so that the amplitudes of the two vibrators are different although their frequencies remain the same in order to realize the dynamic balance of the resonator (dynamic symmetry).

The two theta-shaped vibrators may be stamped out of spring metal plate of constant thickness or also out of profile plates so as to have a variable thickness.

The vibrators and the masses may be made of the same or of different materials, for instance of laminated material.

What I claim is:

1. A mechanical resonator for normal frequency oscillators in timekeepers comprising fixed mounting means for the resonator, two resilient vibrators, each of said vibrators forming one-half of the resonator having the general shape of a capital theta arranged symmetrically in relation to the center of gravity of the resonator, a mass located in the middle of each resonator so that a first axis of symmetry runs midway between and parallel to the transverse branches of the theta form and a second axis of symmetry, perpendicular to the first, runs through the middle of the two masses, the axes of symmetry intersecting in the center of gravity of the resonator, coupling means coupling said two vibrators together, resilient bearings connecting said coupling means resiliently with said mounting means whereby the bearing reactions excepting those of a higher order resulting from unavoidable imperfections will disappear and eliminate the influence of a gravitational field on the frequency of the resonator.

2. A resonator according to claim 1 wherein said masses are each secured in the middle of said transverse branches.

3. A resonator according to claim 1 wherein said masses are each secured to two centers lying opposite to one another of the side arms of the vibrator.

4. A resonator according to claim 1 wherein said masses are identical and said two vibrators are of the same stiffness.

5. A resonator according to claim 1 wherein said masses are different and said two vibrators are of correspondingly different stiffness so that the amplitudes of said two vibrators are different while their frequencies are the same to realize the dynamic balance of the resonator.

6. A resonator according to claim 1 wherein said two vibrators are of spring metal plate of constant thickness.

7. A resonator according to claim 1 wherein said vibrators are profile plates with a variable thickness.

8. A resonator according to claim 1 wherein said vibrators and masses are made of the same material.

9. A resonator according to claim 1 wherein said vibrators and masses are of different materials.

10. A resonator according to claim 1 wherein securing means are provided consisting in a single securing point connected to a single coupling member by means of a single bearing member.

11. A resonator according to claim 1 wherein securing means are provided consisting in two securing points, each of which is connected by means of a bearing member to a coupling member, said securing points and bearing members lying symmetrically opposite to one another on a third axis of symmetry, which is perpendicular to the two first-mentioned axes of symmetry and runs through the center of gravity of the resonator.

References Cited

UNITED STATES PATENTS 3,170,278 2/1965 Stutz ---------------- 58—23

RICHARD B. WILKINSON, *Primary Examiner.*

EDITH C. SIMMONS, *Assistant Examiner.*